Sept. 8, 1970 J. RODET ET AL 3,528,102

SEMICONDUCTOR HEADER ASSEMBLY AND METHOD OF FABRICATION THEREOF

Filed Feb. 26, 1968 2 Sheets-Sheet 1

INVENTORS
JACQUES RODET
BY DANIEL RENOUF
Frank R. Trifari
AGENT

INVENTORS
JACQUES RODET
BY DANIEL RENOUF
Frank R. Trifari
AGENT

United States Patent Office 3,528,102

Patented Sept. 8, 1970

3,528,102

SEMICONDUCTOR HEADER ASSEMBLY AND METHOD OF FABRICATION THEREOF

Jacques Rodet, Lebisey-Caen, and Daniel Reouf, d'Harcourt-Caen, France, assignors, by mesne assignments, to U.S. Philips Corporation, New York, N.Y., a corporation of Delaware Filed Feb. 26, 1968, Ser. No. 708,386
Claims priority, application France, Feb. 23, 1967, 96,270
Int. Cl. H01l 3/00, 5/00
U.S. Cl. 317—234 13 Claims

ABSTRACT OF THE DISCLOSURE

A semiconductor body is supported on a metal plate of high thermal conductivity having openings which register with tubular projections on a metal slab to which the plate is soldered. Electrodes on the upper surface of the semiconductor body are electrically connected to terminal pins which respectively pass through and are insulated in the tubular projections by the fusion of insulating beads. The soldering of the plate to the slab, the welding of the hood to the slab, and the fusion of the insulating beads are all accomplished in a simultaneous heat treatment. In one embodiment, the beads have a coefficient of expansion which is lower than that of the metal slab, thereby sustaining compression, whereas in an alternative embodiment the insulating beads have a coefficient of expansion about equal to that of the metal slab, relying on oxide-diffusion for bonding.

The invention relates to a composite header and the manufacture thereof, particularly for arranging semiconductor elements inside a protective hood.

High power semiconductor devices such as transistors which may be traversed by currents of a few amperes are usually housed in closed metal envelopes. The seal is usually obtained by cold welding a hood to a header supporting the crystal, whilst insulated conductors, serving as connecting terminals, are passed through said header. The insulation of said conductors is in general obtained by means of a sealed glass bead and the sealed assembly of the conductor. The glass bead and the directly surrounding metal is termed a glass-metal passage. The cold welding connection of the envelope does, however, not guarantee a complete seal and in order to obtain a satisfactory stability the cold welding method has to be replaced by a method ensuring a complete seal.

The hood could be soldered to the header by means of a low-melting-point soft solder alloy, but the industrial application of this method involves numerous difficulties and does not provide full safety.

The header of a high-power semiconductor device usually consists of copper, which metal is selected on account of its good thermal conductivity in order to ensure a satisfactory heat dissipation of the device to be cooled. Since electrical welding of the copper header cannot be satisfactorily carried out, attempts have been made to modify the structure of the headers initially designed for the cold welding method to an extent such that a seal can be obtained by electrical welding, since this method is the best one for industrial purpose.

It is known to replace the copper header by a composite header consisting of a copper plate arranged on a slab of a ferro-metal, to which the crystal is subsequently secured, said plate serving for heat dissipation, whereas the slab can be electrically welded to the hood.

Said two parts of the header may be joined in different ways. The two parts may lie in the same plane and may have the same thickness; they may be formed by a copper disc surrounded by steel, but this composition does not ensure a satisfactory seal, especially along the junction of the two elements. In a further known device the copper plate is soldered directly to the slab of a different metal, so that it covers the slab partly. However, difficulies may arise by the requirement of providing the glass-metal passage in the header in a separate operation. This involves additional risk of defects and leakage, since these glass-metal passages have to be made each at a separate place by sealing a glass bead between a metal tube solderable in the header and a pin serving as a terminal for the device. The cost of manufacture is thus raised considerably.

In order to improve the heat dissipation the copper plate has to be thicker than the slab in accordance with the maximum permissible thickness of the header so that the ratio between the thickness values is at a maximum. In the known headers the copper plate supporting the crystal is held in position by means of a depression of the slab, owing to which the latter has to be fairly thick; moulding such slabs brings about high costs by the complicated manufacture.

The invention permits mitigating said disadvantages.

The header of a semiconductor device according to the invention, consisting of a slab of an electrically satisfactorily weldable metal and a plate of a good thermally conductive metal, supporting the semiconductor crystal and connected electrically and thermally with the slab, which is partly covered by said plate, whilst the assembly of the slab and the plate have at least two electrically insulated, sealed passages, is characterized in that the slab is provided with openings in the form of tubular channels projecting from the palne of the slab, accommodating the electrically insulated, sealed conductor connections and in that the plate supporting the semiconductor crystal is provided with openings so that the position of the plate on the slab is determined by said openings receiving the tubular channels.

Since the slab has a small thickness, the thickness of the crystal supporting plate of good thermally conductive metal may be much larger so that with respect to heat resistance the assembly may have very satisfactory properties.

The tubular channels projecting from the surface and forming the walls of the openings in the slab are integral with the slab. It is therefore not necessary to provide said tubular parts by soldering, which eliminates the risk of leakage involved in each soldering joint. The manufacture may furthermore be simplified by providing said tubular channels simultaneously in the slab punching operation, so that machining of the slab is performed in a single mechanical operation. A depression in the slab for holding the plate in position is no longer required so that the thickness of the slab may be very small, which involves a considerable economy of material.

The invention furthermore relates to a method of manufacturing said headers from the various components, in which method the slab and the plate are soldered together and at the same time the conductive passages through the beads of insulating material are sealed in the slab. The various components are arranged in position on an appropriate support and united in a simple thermal treatment of the assembly.

The soldering material and the insulating material are selected so that their working temperatures are compatible.

In the method according to the invention the number of thermal treatments for the manufacture of the composite headers is reduced to a minimum. This provides particularly the advantage that the slab need not be heated several times in succession, which may give rise to an enlargement of the metal cystals. It is known that the fineness of the metal crystals is an important factor for obtaining a seal of a soldering joint as required in this case between the slab and the hood, when the envelope is closed.

The invention will now be described more fully with reference to the drawing.

Figure 1:
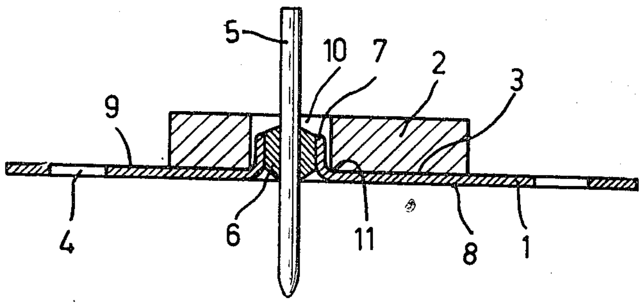
FIGS. 1 and 2 are a sectional view taken on the line I—I in FIG. 2 and a plan view of the header of a transistor according to the invention.
Figure 2:
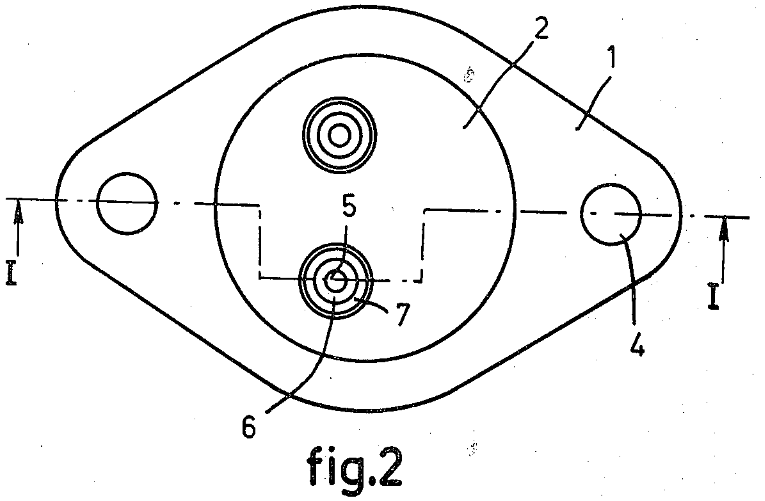

The header shown in FIGS. 1 and 2 is formed by a substantially flat slab 1 of rhombic shape, formed by a thin plate of a metal satisfactorily electrically weldable to the metal of a hood to be fastened to the header. A plate 2 of good thermally conductive metal is secured, for example, by means of a hard solder, to the slab 1. At 3 a soldering layer is indicated between the plate 2 and the slab 1.

The slab 1 is provided with openings 4 for fastening the device to a support. The slab has furthermore two circular openings, obtained by punching, whilst around the openings an upright wall 7 in the form of a tube is made, which will hereinafter be termed a channel. The plate 2 is provided with two openings 10, having a diameter slightly exceeding the outer diameter of the channels 7, said two openings 10 registering with the openings of the channels 7 in the slab 1.

An insulating sleeve 6, surrounding a conductor 5 in an air-tight manner, provides an air-tight seal by its connection with the inner surfaces of the channels 7. The correct position of the plate 2 relative to the slab 1 is accurately determined by the outer edge of the channels 7 in the openings 10. The rounded-off parts 11 produced by punching are minimized so that the clearance space between the broached openings 10 and the outer diameter of the channel walls is reduced. If a fairly large rounded part 11 is unavoidable, the edges of the openings 10 are bevelled.

Figure 4:
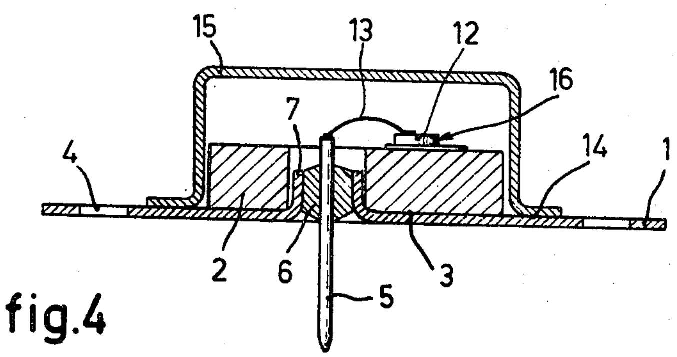
FIG. 4 is a sectional view of a semiconductor device comprising a header as is shown in FIGS. 1 and 2.

The header shown in FIGS. 1 and 2 may be provided with a semiconductor crystal 12 (FIG. 4), in which the various zones of the desired conductivity to form, for example, a transistor are provided. The crystal is soldered at 16 to the plate 2 and one of the zones is electrically connected through the soldering joint to the plate and the slab 1.

The two further zones of the transistor are electrically connected to the two conductive through-connections 5 by means of conductors 13, which may be fastened by thermo-compression, by soft solder, ultrasonically or by other means. A hood 15 is electrically welded to a circular ring 14 on the slab 1, the metal of said ring being selected so that a satisfactory weld is obtained. The channels 7 form tubular passages, the outer diameter of which has to be slightly smaller than the diameter of the openings in the plate, whilst the clearance between said dimensions determines the accuracy of the disposition of the plate on the slab during mounting and soldering. The clearance space may be of the order of 0.1 mm.

In a particular embodiment of the invention the plate 2 consists of copper, the slab 1 of steel or an iron-nickel-cobalt alloy and the passages are formed by glass-metal joints, the glass being chosen so that an air-tight seal between the glass and the metal of the slab can be obtained. The hermetic seal of this area may be obtained in two different ways: the expansion coefficient of the glass may be lower than that of the metal of the slab, in which case the seal is obtained by "compression" or the expansion coefficient of the glass and of the slab may correspond with each other, in which case the seal is obtained by the diffusion of an oxide of the metal in the glass.

Such a header is obtained by dispersing the slab and the plate with the interposition of a mould of a soldering alloy on an appropriate substrate, for example, of graphite, soldering being subsequently carried out by passing the assembly through a furnace, whilst at the same time the insulated conductors 5 are sealed in.

Figure 3:
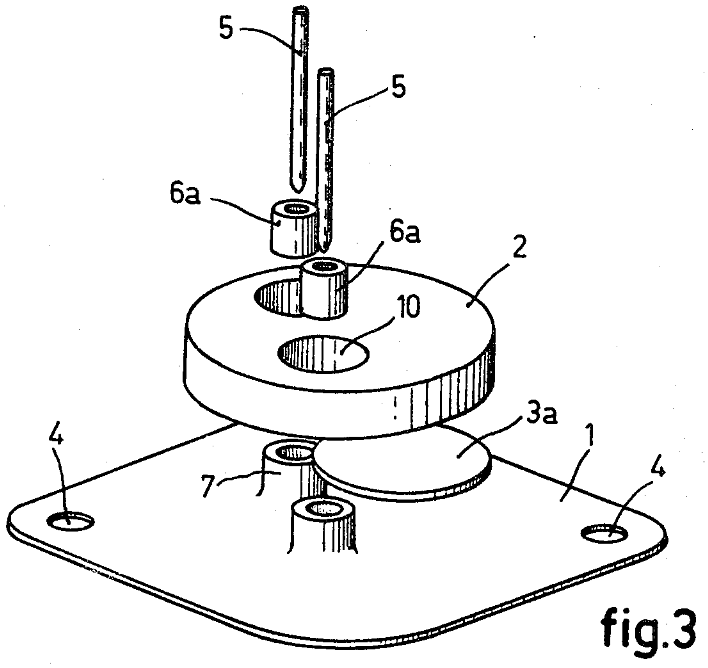
FIG. 3 is a perspective view of the various components of the header of FIGS. 1 and 2.

FIG. 3 shows the components of the header prior to said operation. In this embodiment the solder for fastening the plate 2 to the slab 1 is provided in the form of a thin tablet of an alloy 3*a* and the insulating material between the conductive connections 5 and the channels 7 is provided in the form of beads 6*a*. If the conductors are made of an iron-nickel alloy or an iron-nickel-cobalt alloy, the beads are made of glass, whilst said mould may be formed by a tablet of very small thickness of an eutectic copper-silver alloy. These components are positioned on the graphite substrate and the assembly is passed through a tunnel furnace having a slightly reducing atmosphere, the temperature characteristics being chosen as desired.

By way of example an example of the method according to the invention for obtaining a composite header as shown in FIGS. 1 to 3, particularly for use in a high-power transistor will be described hereinafter.

The various parts of the header are manufactured separately. A slab 1 of small thickness of particularly soft steel is punched so that at the same time the fastening apertures and the channels for the glass-metal through-connections are provided. The thickness of this slab is chosen to be at a minimum in respect of the necessity of forming the channels and of soldering the hood. Said thickness may be from 0.5 to 1.5 mms. and may be, for example, 0.8 mm. The slab is degreased, degassed, chemically polished and finally nickel-plated by galvanic agency. A copper plate 2 of large thickness of oxygen-free quality, for example, of the commercially available quality OFHC R307, is also punched in the desired shape corresponding with that of the slab, particularly in respect of the openings corresponding to the channels of the slab. The thickness of the plate 2 is at a maximum taking into account the height of the space between the slab and the hood 15 of the device and the thermal inertia admissible in welding. This thickness may be from 1.5 to 5 mms. and it is preferably 2.5 or 3 mms. The plate is degreased, etched and then sintered.

A soldering tablet of an eutectic copper-silver alloy is also punched so that it can be sandwiched between the two said components. The surface and the thickness of said tablet are chosen so that the quantity of material strictly required for soldering is available. Two glass beads are made by compression and sintering. It is preferred to use a kind of glass having an expansion coefficient of $90\times10^{-7}$, which is lower than that of the steel of the slab. Two pins of an iron-nickel rod of a diameter of about 1 mm. are degreased, sandblasted and then electrolytically nickel-plated.

The components thus manufactured are disposed on a graphite substrate having a flat surface, on which bears the slab holding the soldering tablet, on which the copper plate is deposited, and held in place by the channels made in the slab. The flat surface of the substrate has two openings for receiving the pins and the glass beads are slipped on said pins so that they get inside the channels.

The substrate preferably holds a plurality of said assembled components so that a plurality of headers can be made simultaneously. The substrate is introduced into a tunnel furnace of an accurately defined temperature characteristic curve, in which the assembly is heated at a temperature of about 1050° C. The atmosphere in the furnace must not be oxidizing, in order to avoid oxidation of the surfaces to be soldered. Therefore the atmosphere has to have a slightly reducing effect and it may therefore consist of nitrogen with a very slight percentage of hydrogen. The glass-metal passages and the soldering tablet between the slab and the copper plate are simultaneously fused in the furnace. Consequently, the seal is obtained by "compression" of the metal on the glass during cooling. The seal may also be obtained by choosing equal expansion coefficients of the glass and of the metal to be soldered thereto. The tightness of the soldering joint is then obtained by the diffusion of the metal oxide in the glass. This variant thus requires pre-oxidation of the pins and of the slab at the sealing areas of the glass; this oxidation should not be affected by too high a reducing effect of the furnace in which the fusion and the soldering are performed.

Instead of the hard solder in the form of a tablet between the plate and the slab, a layer of a metal or an alloy forming a hard solder may be provided previously on the slab and the plate, in which case soldering and fusion are carried out simultaneously in a furnace as described above. The slab may consist of electrically nickel-plated steel and the plate of electrically and then chemically nickel-plated copper, whilst otherwise the method is similar to that described above. The chemically deposited nickel on the plate serves as the hard solder. It is known that chemical nickel-plating comprises the deposition of a nickel-phosphorus alloy having about 8% of phosphorus, the melting point being about 900° C. Therefore such a deposition may be used as a hard solder. The thermal characteristics of the glass of the passages and the soldering temperature have, of course, to be chosen accordingly.

What is claimed is:

1. A semiconductor header assembly comprising in combination:

a slab of electrically weldable metal having at least two upwardly projecting channelled protrusions integral therewith, and a metal plate for supporting a semiconductor crystal and of high electrical and thermal conductivity, substantially thicker than said slab, partially covering said slab and fastened on one surface to said slab, the metal plate having at least two openings constructed to register with said channelled protrusions, the slab and the plate having at least two electrically insulated, sealed-through conductors within said channelled protrusions, the position of the plate on the slab being determined by the projecting channels which register with the openings in the plate.

2. A header as claimed in claim 7 wherein the plate and the slab are secured to each other by hard solder.

3. A header as claimed in claim 1 wherein the slab consists of nickel-plated soft steel and the plate of copper and the conductors are made of an iron-nickel-cobalt alloy and sealed in glass so as to be insulated.

4. A semiconductor header assembly as set forth in claim 1 in combination with a semiconductor wafer mounted on the other surface of said metal plate and having two electrodes, and means connecting the wafter electrodes to the sealed-through conductors.

5. The header according to claim 1 wherein the thickness of the plate is between 1.5 and 5 mm. and the thickness of the slab is between 0.5 and 1.5 mm.

6. The header according to claim 1 wherein the openings in the plate are of slightly larger diameter than the channels in the slab and the clearance is about 0.1 mm.

7. The header according to claim 1 wherein the plate is oxygen-free copper and is fastened to the slab by solder which is a eutectic copper-silver alloy.

8. The method of manufacturing a header according to claim 1 which comprises:

laying a slab of an electrically weldable metal which has at least two projecting channels on a support, laying a plate on the slab, the plate having at least two openings whereby the openings on the plate register with the channels on the slab, placing soldering material between the slab and the plate, fusing beads of insulating material in the conduits of the conductors so as to achieve sealed-through connections, soldering the slab to the plate and carrying out the operation of fusion of the beads during the same thermal operation as the soldering together of the slab and the plate.

9. A method as claimed in claim 7 wherein the slab having the tubular channels is obtained by punching and simultaneous mechanical moulding, a mold of a soldering alloy is arranged between the plate and the slab, the solder consists of a eutectic copper-silver alloy and soldering of the plate to the slab and sealing of the glass-metal through-connections are simultaneously carried out in a tunnel furnace having a slightly reducing atmosphere at a temperature between 900° C. and 1100° C.

10. The method according to claim 4 wherein said insulating material is glass of an expansion coefficient lower than the expansion coefficient of the metal of the slab, whereby the seal is obtained by compression.

11. The method according to claim 4 wherein said insulating material is glass of an expansion coefficient in the same order as the slab and the seal is obtained by diffusion of an oxide of the metal into the glass.

12. The method according to claim 6 wherein the expansion coefficient of the glass is $90\times10^{-7}$.

13. The method according to claim 7 wherein the slab is of electrically nickel-plated steel and the plate is of nickel-plated copper and the nickel deposited on the copper is the soldering material.

References Cited

UNITED STATES PATENTS

| | | | |
|---|---|---|---|
| 2,975,928 | 3/1961 | Roovers | 317—235 |
| 3,119,052 | 1/1964 | Tsuji | 317—234 |
| 3,219,748 | 11/1965 | Miller | 317—234 |
| 3,258,662 | 6/1966 | Fleming | 317—234 |
| 3,419,763 | 12/1968 | Beaudouin | 317—234 |

JOHN HUCKERT, Primary Examiner

A. J. JAMES, Assistant Examiner

U.S. Cl. X.R.

29—25.3